United States Patent [19]

Dieckmann

[11] 3,872,155

[45] Mar. 18, 1975

[54] ESTERS OF BROMINATED DIPENTAERYTHRITOL

[75] Inventor: Steffen F. Dieckmann, Wilmington, Del.

[73] Assignee: Hercules Incorporated, Wilmington, Del.

[22] Filed: June 22, 1973

[21] Appl. No.: 372,577

Related U.S. Application Data

[63] Continuation-in-part of Ser. No. 47,897, June 19, 1970, abandoned.

[52] U.S. Cl.... 260/476 R, 260/45.75 R, 260/45.85, 260/473 S, 260/474, 260/487, 260/488 J
[51] Int. Cl.. C07c 69/16, C07c 69/62, C07c 69/78, C07c 69/88, C07c 69/92
[58] Field of Search............ 260/488 J, 487, 476 R, 260/473 S, 474, 410.6

[56] References Cited
UNITED STATES PATENTS

| | | | |
|---|---|---|---|
| 2,816,912 | 12/1957 | Engelmann | 260/488 J |
| 2,827,480 | 3/1958 | Harris et al. | 260/488 J |
| 2,962,419 | 11/1960 | Minich | 260/488 J |
| 3,287,419 | 11/1962 | Duke et al. | 260/488 J |

*Primary Examiner*—Vivian Garner
*Attorney, Agent, or Firm*—Hazel L. Deming

[57] ABSTRACT

Aliphatic and aromatic esters of polybrominated dipentaerythritol such as, for example, the diacetate of tetrabromodipentaerythritol, the diacetate of dibromodipentaerythritol and the dibenzoate of tribromodipentaerythritol are described. The esters are prepared by hydrobrominating dipentaerythritol at about 100° to about 140°C. in the acid which is to be used for esterification. The esters are useful as flameproofing agents for synthetic resins.

4 Claims, No Drawings

ESTERS OF BROMINATED DIPENTAERYTHRITOL

This application is a continuation-in-part of my U.S. application Ser. No. 47,897, filed June 19, 1970, now abandoned.

The present invention relates to esters of brominated dipentaerythritol which are useful as flameproofing agents for synthetic resins. More particularly this invention relates to the saturated aliphatic and aromatic esters of polybrominated dipentaerythritol.

It is known that the flame retardancy of readily flammable plastics can be improved by the incorporation of halogen compounds, and particularly chlorinated hydrocarbons therein. It is also known that certain bromine compounds are more effective flameproofing agents than the corresponding chlorine compounds, and that flame retardancy can be achieved with much smaller amounts of these additives. Most bromine containing compounds, however, are not stable at the elevated temperatures required for molding or spinning into fibers such polymers as polypropylene, poly(ethylene terephthalate), polystyrene and the like.

Now, in accordance with this invention it has been found that certain esters of brominated dipentaerythritol are not only effective fire retardant additives for synthetic resins but that these compounds possess outstanding thermal and light stability, have low volatility and do not discolor or detract from the physical properties of materials containing them.

The bromine compounds of this invention are the esters of brominated dipentaerythritol prepared by hydrobrominating dipentaerythritol in solution in an excess of an esterifying acid which is an unsubstituted or halosubstituted saturated aliphatic monocarboxylic acid containing 2 to 7 carbon atoms, benzoic acid, a substituted benzoic acid containing as substituents at least one halogen, lower alkyl, lower alkoxy or hydroxyl groups or a mixture of any of said acids at a temperature ranging from about 100° to about 140°C. The esters are presumed to have the formula

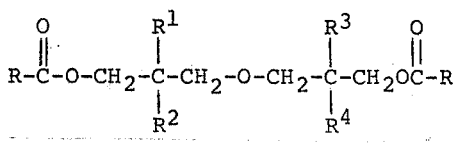

where R is an alkyl or haloalkyl group containing 1 to 6 carbon atoms, phenyl or a phenyl group substituted with halogen, hydroxy, lower alkyl or lower alkoxy substituents, $R^1$ is a bromine substituted methyl group which can be $-CH_2Br$, $-CHBr_2$ or $-CBr_3$, and $R^2$, $R^3$ and $R^4$ are $R^1$, $-CH_2OH$ or $-CH_2OOCR$ (where R is as indicated above). Each R in the above formula can be alike or different, and when R is an alkyl or haloalkyl group it is preferably a methyl, chloromethyl, bromomethyl, ethyl or propyl group. Each $R^2$, $R^3$ and $R^4$, in addition to being $-CH_2OH$ or $-CH_2OOCR$, can also be a bromine substituted methyl group, i.e., a $-CH_2Br$, $-CHBr_2$ or $-CBr_3$ group and can be the same as or different from the $R^1$ substituent or each other. R, as indicated, can also be phenyl or a substituted phenyl group containing one or more lower alkyl (including haloalkyl), lower alkoxy, halogen or hydroxy substituents. Preferred groups of this type include phenyl, tolyl, anisyl, phenetyl, salicyl, chlorophenyl and bromophenyl groups. Preferably the substituted phenyl group will contain from 6 to 12 carbon atoms.

The esters of this invention are prepared by hydrobrominating dipentaerythritol at from about 100° to about 140°C. in the acid which is to be used for esterification. The acid, as stated, is an unsubstituted or halosubstituted saturated aliphatic monocarboxylic acid containing 2 to 7 carbon atoms, benzoic acid, a substituted benzoic acid containing as substituents at least one halogen, lower alkyl, lower alkoxy or hydroxyl groups or a mixture of any of these acids. Typical acids include acetic acid, propionic acid, n-butyric acid, isobutyric acid, n-valeric acid, trimethylacetic acid, caproic acid, n-heptylic acid, chloroacetic acid, bromoacetic acid, dichloroacetic acid, dibromoacetic acid, trichloroacetic acid, tribromoacetic acid, α-chloropropionic acid, α-bromophopionic acid, β-chloropropionic acid, β-bromopropionic acid, benzoic acid, o-, m- or p-chlorobenzoic acid, o-, m- or p-bromobenzoic acid, o-, m- or p-toluic acid, salicylic acid, m-hydroxybenzoic acid, p-hydroxybenzoic acid, anisic acid, o-methoxybenzoic acid, o-, m- or p-ethoxybenzoic acid, and mixtures thereof. Thus, the reaction can be carried out simply by bubbling hydrogen bromide gas through a solution of the dipentaerythritol in excess acid, the desired level of bromine addition being controlled by contact time and temperature. The reaction is preferably carried out in the presence of an esterification catalyst such as a metal salt which is typically zinc acetate or zinc bromide. The amount of catalyst used will usually range from about 2 to 5 percent by weight of the dipentaerythritol.

The invention is further illustrated by the following examples wherein all parts and percentages are by weight unless otherwise specified.

EXAMPLE 1

A solution of 420 parts of glacial acetic acid, 100 parts of dipentaerythritol and 5 parts of zinc acetate in a reaction vessel was heated to 115°C. and maintained thereat for 12 hours under a hydrogen bromide sparge until no more hydrogen bromide was absorbed. The reaction solution was next cooled and then precipitated into water under vigorous agitation. The precipitate was recovered, washed thoroughly with water, and then dried under vacuum at 110°C., giving a light tan, highly viscous liquid which was determined to be the diacetate of tetrabromodipentaerythritol. Elemental analysis gave the following results:

| Determination | Found | Theory For $C_{14}H_{22}O_5Br_4$ |
| --- | --- | --- |
| carbon | 28.9% | 28.5% |
| hydrogen | 3.9 | 3.7 |
| oxygen | 13.2 | 13.5 |
| bromine | 53.3 | 54.3 |

The molecular weight, determined by vapor phase Osmometry was found to be 634 (theoretical 590). The product showed the following volatility characteristics by thermogravimetric analyses run in nitrogen at a heating rate of 5°C./minute.

| Temperature °C. | Weight Loss (%) |
|---|---|
| 125 | 0 |
| 150 | 1 |
| 175 | 2 |
| 200 | 6 |
| 225 | 15 |
| 250 | 34 |

EXAMPLE 2

A solution of 210 parts of glacial acetic acid, 25 parts of dipentaerythritol and 1 part of zinc acetate in a reaction vessel was heated to 118°C. and maintained thereat for 2 hours, the solution being maintained under a hydrogen bromide sparge during the last 1 hour of heating. After the 2-hour heating period, the reaction mixture was cooled and the product separated threfrom and recovered as in Example 1. The product was determined to be the diacetate of dibromodipentaerythritol. Elemental analysis gave the following results:

| Determination | Found | Theory for $C_{14}H_{24}O_7Br_2$ |
|---|---|---|
| carbon | 36.9% | 36.2% |
| hydrogen | 5.3 | 5.2 |
| oxygen | 23.9 | 24.1 |
| bromine | 32.1 | 34.5 |
| hydroxyl | 7.4 | 7.3 |

The product showed the following volatility characteristics by thermogravimetric analyses run in nitrogen at a heating rate of 10°C./minute.

| Temperature °C. | Weight Loss (%) |
|---|---|
| 125 | 0 |
| 150 | 0 |
| 175 | 1 |
| 200 | 4 |
| 225 | 14 |
| 250 | 42 |

EXAMPLE 3

A mixture of 25 parts of dipentaerythritol, 100 parts of benzoic acid and 1 part of zinc acetate in a reaction vessel was heated to 122°C. and maintained thereat for 3 hours under a hydrogen bromide sparge, after which time the reaction solution was precipitated into water. The precipitate was recovered, dried and next dissolved in acetone and reprecipitated in water. The reprecipitated product was recovered and then dried under vacuum at 120°C. The product was determined to be the dibenzoate of tribromodipentaerythritol. Elemental analysis gave the following results:

| Determination | Found | Theory For $C_{24}H_{27}O_6Br_3$ |
|---|---|---|
| carbon | 45.4% | 44.3% |
| hydrogen | 4.0 | 4.2 |
| oxygen | 13.5 | 14.7 |
| bromine | 37.1 | 36.8 |
| hydroxyl | 0.3 | 0.3 |

The product showed the following volatility characteristics by thermogravimetric analyses run in nitrogen at a heating rate of 10°C./minute.

| Temperature °C. | Weight Loss (%) |
|---|---|
| 125 | 0 |
| 150 | 0 |
| 175 | 0 |
| 200 | 0 |
| 225 | 0 |
| 250 | 0.5 |
| 275 | 2 |
| 300 | 6 |

As stated above, the compounds of this invention are effective flame retardant additives for readily flammable resins. Moreover, because they are thermally stable at conventional molding or extrusion temperatures and do not discolor or void during molding they are ideally suitable for use with such polymers as the polyolefins, polyesters, polyamides, polystyrene, polyurethanes and the like. Moreover, the compounds of the invention provide flame retardant compositions from polymers with only a small amount of additive. If desired, an antimony compound such as antimony trioxide can also be used in combination with the esters of bromodipentaerythritol to provide a synergistic effect. The presence of antimony, however, is not required for flame retardancy.

The use of the compounds of this invention as flame retardants for polymers is illustrated by the following examples. By the term flame retardancy as applied to composition and used throughout this specification is meant a composition which meets the requirements of ASTM D-635 and has a combustion index of at least 0.21, measured according to the method of C. P. Fenimore and F. C. Martin, "Combustion and Flame," 10, 135 (1966).

EXAMPLES 4-9

Molding compositions were made by intimately blending stereoregular polypropylene having a melt index of 4 and an RSV (determined on a 0.1 percent solution in decahydronaphthalene at 135°C.) of 2.9 with various amounts of the brominated dipentaerythritol esters prepared in Examples 1 to 3 (and antimony trioxide, if present) on a two-roll mill at 175°C. for 10 minutes and then compression molding the blends into ⅛ inch plaques using a 4,000 p.s.i.g. press at 175°C. for 10 minutes. The antimony trioxide ($Sb_2O_3$), when present, was in finely divided form and passed a U.S. Standard Sieve No. 200.

Details as to the amount of each component in the composition and flame retardancy test results on the molded plaques therefrom are given in the following Table I.

Table I

| | Compositions (parts by weight) | | | | | | |
|---|---|---|---|---|---|---|---|
| | | Brominated Dipentaerythritol Ester (1) | | | | | |
| Ex. No. | Polypropylene | A | B | C | $Sb_2O_3$ | Combustion Index (2) | ASTM D-635 |
| Control | 100 | — | — | — | — | 0.178 | Burning |
| 4 | 95 | 5 | — | — | — | 0.215 | Self-extinguishing |
| 5 | 92 | 5 | — | — | 3 | 0.240 | Nonburning |
| 6 | 94 | — | 6 | — | — | 0.212 | Self-extinguishing |
| 7 | 91 | — | 6 | — | 3 | 0.240 | Nonburning |
| 8 | 87 | — | — | 13 | — | 0.214 | Self-extinguishing |
| 9 | 88.3 | — | — | 7.8 | 3.9 | 0.244 | Nonburning |
| Control | 95 | — | — | — | 5 | 0.178 | Burning |

(1) "A" designates the product of Example 1; "B", the product of Example 2; and "C", the product of Example 3.
(2) Method of c. P. Fenimore and T. C. Martin, "Combustion and Flame", 10, 135 (1966).

When the above procedure was repeated except that the molding temperature was raised to 235°C., there was again no evidence of discoloration, voiding or loss of bromine.

EXAMPLE 10

A molding composition was prepared by mixing with vigorous agitation in a vessel 95.25 parts of a commercial polystyrene having a molecular weight of 270,000 to 280,000 (as a 10% solution in methylene chloride) and 4.75 parts of the tetrabromodipentaerythritol diacetate prepared in Example 1 and then drying the mixture under vacuum. The dried composition was ground into molding powder and molded into ⅛ inch plaques using a 4,000 p.s.i.g. press at 175°C. for 10 minutes. Flame retardancy test results on the molded plaques gave a combustion index of 0.220, and the plaques were rated as self-extinguishing according to ASTM D-635. A control prepared in the same manner, except that no bromine compound was present, had a combustion index of 0.183 and was rated as burning.

EXAMPLE 11

A molding composition was prepared by intimately mixing in a vessel 90 parts of a commercial room temperature curable unsaturated polyester system comprising 16% maleic anhydride, 25% phthalic anhydride, 28% propylene glycol and 31% styrene, 10 parts of the tetrabromodipentaerythritol diacetate of Example 1 and 1 part of methyl ethyl ketone peroxide curing catalyst. The composition was cast in molds into ⅛ inch plaques and cured at room temperature for 24 hours. Flame retardancy test results on the molded plaques gave a combustion index of 0.218 and the plaques were rated as self-extinguishing according to ASTM D-635. A control treated in the same manner, except that no bromine compound was present, had a combustion index of 0.185 and was rated as burning.

The polymers which can be made flame retardant with the compounds of this invention are any of the readily flammable thermoplastic or thermosetting, rubbery or plastic resins which find utility in extrusion and molding applications. Exemplary of the polymers which can be so flameproofed include the hydrocarbon polymers including saturated, unsaturated, linear, atactic, crystalline or nonlinear amorphous polymers, copolymers, terpolymers, etc., as for example polyethylene, polypropylene, poly(4-methylpentene-1) polybutene-1, polystyrene, styrene—butadiene rubber, butyl rubber, natural rubber, polybutadiene, polyisobutylene, ethylene—propylene copolymer, cis-1,4-polyisoprene, ethylene—propylene—dicyclopentadiene terpolymer, etc., and blends of these polymers with each other. In addition, nonhydrocarbon polymers including the unsaturated and saturated polyesters and particularly poly(ethylene terephthalate), drying and nondrying alkyd resins, etc., polyurethanes; poly(alkylene oxides) such as polyformaldehyde, poly(ethylene oxide), and poly(propylene oxide), etc., poly(arylene oxides) such as poly(phenylene oxide), etc.; the polyamides such as nylon, perlon-L, etc.; poly(vinyl alkyl ethers) such as poly(vinyl methyl ether), etc.; ethylene-vinyl acetate copolymers; poly(ethyl acrylate); poly(ethyl methacrylate); polysulfone; epoxy resins; butadiene-acrylonitrile copolymers; butadiene-acrylonitrile—styrene terpolymers; etc., can be made flame retardant in accordance with this invention. The preferred polymers are homopolymers or random, block or graft copolymrs of α-olefins containing from 2 to 6 carbon atoms, the polystyrenes, the polyamides, the polyurethanes, and the unsaturated polyesters. Particularly preferred are the polymers of propylene. These polymers usually have molecular weights between about 100,000 and 800,000 or higher and can be produced by well-known and conventional methods. Particularly useful are stereoregular or isotactic polypropylenes having a melt index range of at least about 0.3 to 20 and preferably about 3 to 5. Typical comonomers useful for the preparation of propylene copolymers include other α-olefins such as ethylene, butene-1, 3-methyl butene-1, 4-methyl pentene-1, dodecane-1, styrene, and the like. Typical comonomers which can be grafted to the propylene polymer chain to give a so-called graft copolymer include vinyl acetate, vinyl propionate, the acrylic and methacrylic esters of aliphatic alcohols and the like.

Thus, the compounds of this invention provide flame retardant compositions from polymers with very little or no antimony compound and from about 3 percent up to about 15 percent of the bromodipentaerythritol ester. When the bromine containing compound is used as the sole flame retardant, it will preferably be present in an amount sufficient to provide at least 1.9% bromine to the composition. When antimony is present, usually in an amount ranging from 1 to 5 percent by weight of the composition, the amount of the bromine-containing compound will be sufficient to provide at least 1.0% bromine to the composition. It is understood, of course, that the amount of ester necessary to produce a flame retardant polymer will vary within the above limits depending on the particular ester and polymer employed.

The flame retardant compositions can be prepared by mixing the polymer with the flame retardant, i.e., the bromodipentaerythritol ester and antimony compound, if present, in conventional manner, e.g., on roll mills, kneaders or extruders, or by agitating in the presence of an organic solvent. Since uniform mixing of the constituents is essential to reliable results, the mixing operation when the polymer is a thermoplastic resin is preferably carried out by first dry mixing the ingredients and then subjecting the dry mixture to intensive mechanical working at elevated temperatures above the softening point of the polymer and most conveniently by means of compounding rolls, a Banbury mixer or extruder and continuing the working until a uniform mixture is obtained.

The flame retardant compositions of the invention are suitable for the production of molded articles by the usual processing methods and are particularly suitable for the production of film, fiber and plastic molded articles.

What I claim and desire to protect by Letters Patent is:

1. An ester of brominated dipentaerythritol prepared by hydrobrominating dipentaerythritol in solution in an excess of an esterifying acid which is an unsubstituted or halosubstituted saturated aliphatic monocarboxylic acid containing 2 to 7 carbon atoms, benzoic acid, a substituted benzoic acid containing as substituents at least one halogen, lower alkyl, lower alkoxy or hydroxyl group, or a mixture of any of said acids at a temperature ranging from about 100° to about 140°C.

2. The ester of claim 1 wherein the esterifying acid is an unsubstituted saturated aliphatic monocarboxylic acid containing 2 to 7 carbon atoms.

3. The ester or claim 2 wherein the acid is acetic acid.

4. The ester of claim 1 wherein the esterifying acid is benzoic acid.

* * * * *